(12) United States Patent
Andrich et al.

(10) Patent No.: US 10,094,374 B2
(45) Date of Patent: Oct. 9, 2018

(54) OPERATIONAL STATUS CHECKING SYSTEM OF ALTERNATIVE COMPRESSOR VALVE AND METHOD FOR CHECKING OPERATIONAL STATUS OF ALTERNATIVE COMPRESSOR VALVE

(71) Applicant: Whirlpool S.A., São Palo (BR)

(72) Inventors: Roberto Andrich, Joinville (BR); Günter Johann Maass, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 32 days.

(21) Appl. No.: 14/768,003

(22) PCT Filed: Feb. 4, 2014

(86) PCT No.: PCT/BR2014/000032
§ 371 (c)(1),
(2) Date: Aug. 14, 2015

(87) PCT Pub. No.: WO2014/124508
PCT Pub. Date: Aug. 21, 2014

(65) Prior Publication Data
US 2016/0003238 A1      Jan. 7, 2016

(30) Foreign Application Priority Data
Feb. 15, 2013    (BR) .................. 10 2013 003559 9

(51) Int. Cl.
*F04B 51/00* (2006.01)
*F16K 31/06* (2006.01)
(Continued)

(52) U.S. Cl.
CPC ............ *F04B 51/00* (2013.01); *F04B 7/0076* (2013.01); *F04B 39/08* (2013.01);
(Continued)

(58) Field of Classification Search
None
See application file for complete search history.

(56) References Cited

U.S. PATENT DOCUMENTS

| 4,957,074 A | 9/1990 | Weissler, II et al. |
| 5,293,551 A * | 3/1994 | Perkins ................ E21B 34/066 251/129.01 |

(Continued)

FOREIGN PATENT DOCUMENTS

| BR | PI-1105379 A2 | 11/2013 |
| CA | 2622067 A1 | 8/2009 |

(Continued)

*Primary Examiner* — Blake A Tankersley
*Assistant Examiner* — Ruben Parco, Jr.
(74) *Attorney, Agent, or Firm* — Harrington & Smith

(57) ABSTRACT

The present invention refers to a system and method for checking the operational status of alternative compressor valve and more particularly for checking operational status of electrically commanded valves, provided in alternative compressors used in refrigeration systems. In accordance with the present invention, said operational checking system of alternative compressor valve comprises a data processing core (5) capable of estimating one among two possible operations statuses of said metal valve (1) by varying at least one electric parameter provided by said sensor (4), wherein said step of estimating one among two possible operational statuses of said metal valve (1) is effected on the basis of the results from the comparison between said signal of electric parameter from sensor (4) and the predetermined range of data analogous to the electric parameter.

2 Claims, 3 Drawing Sheets

(51) Int. Cl.
*F04B 7/00* (2006.01)
*F04B 39/08* (2006.01)
*F04B 39/10* (2006.01)
*F04B 49/06* (2006.01)
*F04B 53/10* (2006.01)
*G01D 5/12* (2006.01)

(52) U.S. Cl.
CPC .......... *F04B 39/1073* (2013.01); *F04B 49/06* (2013.01); *F04B 53/1082* (2013.01); *F16K 31/06* (2013.01); *G01D 5/12* (2013.01)

(56) References Cited

U.S. PATENT DOCUMENTS

| | | | |
|---|---|---|---|
| 2007/0272178 A1 | 11/2007 | Brun et al. | |
| 2012/0029785 A1* | 2/2012 | Loos | B60T 8/36 701/93 |
| 2012/0059524 A1* | 3/2012 | Caldwell | F04B 49/22 700/282 |
| 2015/0231316 A1* | 8/2015 | Aalders | A61M 1/06 604/74 |

FOREIGN PATENT DOCUMENTS

| | | | | |
|---|---|---|---|---|
| GB | 2416196 A | * | 1/2006 | ............. F04B 39/06 |
| GB | 2416196 A | | 1/2006 | |
| WO | WO-2013097006 A1 | | 7/2013 | |

* cited by examiner

OPERATIONAL STATUS CHECKING SYSTEM OF ALTERNATIVE COMPRESSOR VALVE AND METHOD FOR CHECKING OPERATIONAL STATUS OF ALTERNATIVE COMPRESSOR VALVE

CROSS-REFERENCE TO RELATED APPLICATIONS

The present application is a U.S. National Phase of International Patent Application No. PCT/BR2014/000032, filed on Feb. 4, 2014, and claims priority to Brazilian Patent Application No. BR 10 2013003559 9, filed on Feb. 15, 2013, each, including all disclosures and specifications, are hereby expressly incorporated herein in their entirety by reference thereto.

FIELD OF THE INVENTION

The present invention refers to a system and method for checking the operational status of an alternative compressor valve and more particularly for checking the operational status of electrically actuated (metal type pallet) valves, provided in alternative compressors used in refrigeration systems.

Generally, said system refers to an assembly of functional components, preferably already existing in alternative compressors which allow for conducting the method for checking the operational status of alternative compressor valve.

Thus, said method relates to functional logics that includes the operational status checking system of alternative valve compressor can determine the operational status of a valve based on alteration in the magnetic field generated by same.

BACKGROUND OF THE INVENTION

As already known by those skilled in the art, alternative compressors comprise machines and/or devices capable of altering a working fluid pressure as well as pumping it. In this sense, and more specifically speaking, said alternative compressors are capable of altering the working fluid pressure by controllably altering the volume of a compression chamber that is usually defined by a cylindrical chamber which receives working fluid and moving piston. Hence, the compression chamber volume is alternatively altered (reduced or increased) in function of the moving piston displacement in its interior. Inlet and removal of working fluid are orderly managed by suction valves and discharge valves which have their statuses alternatively switched.

It is also known by those skilled in the art that (suction) inlet steps and (discharge) removal steps of the working fluid inside the compression chamber are crucial steps for the correct operation of an alternative compressor, which have an direct effect on the compressor performance parameters and accordingly the present state of the art comprises a wide range of valves intended to control suction and discharge of working fluid in the compressor chamber interior.

In alternative compressors used in refrigeration systems, there should particularly mentioned the use of pallet-type valves. Pallet-type valves are extremely conventional and comprise, in brief, thin metal blades with a contour which edge is the (suction or discharge) orifice sealing surface and the body connecting the sealing surface with the valve securing point.

According to more conventional embodiments, it can be noted that the present suction valves have a normally closed configuration and their automatic and not commanded "opening" occurs uniquely and exclusively when the piston is at the superior neutral point and descends towards the lower neutral point. And conventional discharge valves also have a normally closed configuration and their automatic and not commanded "opening" uniquely and exclusively takes place when the piston starts from the lower neutral point and goes towards the superior neutral point, increasing the pressure inside the cylinder, that is, when the pressure inside the cylinder is higher than the pressure in the discharge chamber.

This means that in accordance with the most conventional embodiments, operability of the present suction and discharge valves is based on the working frequency of a compressor, wherein pallets are designed to give rapid responses and reduced bending strain.

Pallet-type suction and discharge valves, in which the operational status is selectively switched by actuation of at least a magnetic field-generating element, are also known. An exemplary embodiment of this concept is disclosed in the BR Patent Application PI1105379-8.

According to BR PI1105379-8, the present state of the art further provides a semi-commanded valve system applied to an alternative compressor comprising pallet-type valves which once pre-stressed in a first operational status can be switched to a second operational status through actuation of electric coils duly aligned to the respective valves thereof.

Said system also permits to modulate the compressor capacity with no need to vary the operational speed of its electric motor such that the amount of mass that passes through the suction orifices and discharge orifices can be controlled.

Although the valve system described in this document BR PI1105379-8 achieves the desired objectives it is further observed that same does not comprise means capable of checking the status of the suction and discharge valves.

This means that the valve system disclosed in BR PI1105379-8, in addition to the remaining valves systems known from the present state of the art, are not capable of checking whether or not the real operational status of a valve corresponds to the system-commanded operation status, that is, checking whether or not a suction valve is really opened or closed in the cycles during suction cycles.

The closest embodiment for effecting such checking is found in patent document CA2622067, which refers to a system (for screw compressor) wherein an angularly movable metal component has it movement measured by a magnetic sensor that generates an electric signal to a processor, wherein the distance variation between the metal component is capable of inducing a magnetic field measurable in a sensor.

Therefore, it can be noted that said system taught by CA2622067 is capable estimating the "location" of a movable component of a screw compressor. However, it does not teach how to measure the operational status of linearly alternative performance valves.

Based on this context, the present invention was developed.

OBJECTS OF THE INVENTION

By this way, one of the objects of the present invention is to provide a status checking method of alternative compressor valve which, in a simplified form, is capable of assessing the real operational status of at least a linearly alternative performance (metal pallet-type) valve by varying a magnetic field generated by same so as to reduce the energy amount spent during actuation of said valve.

Another object of the present invention is to immediately withdraw the current and voltage applied to the coil in the case where undue opening of a valve is detected in order to protect said valve from breaking.

In addition, it also an object of the invention to provide a status checking system of alternative compressor valve which, based on the components already disclosed in the alternative compressor, is capable of performing the status checking method of alternative compressor valve.

SUMMARY OF THE INVENTION

These and other objects now disclosed are entirely achieved by the system and method for checking the operational status of alternative compressor valve.

The system itself comprises at least one metal valve functionally disposed in at least a compressor cylinder of an alternative compressor, at least an inductive component, at least a sensor and at least a data processing core. Said metal valve in turn refers to a valve capable of being switched between two operational statuses (between an "opened" operational status and a "closed" operational status), and comprises a semi-commanded pallet-type valve.

In accordance with the present invention, the inductive component is capable of inducing an electromagnetic field whose intensity varies in accordance with the relative proximity of the metal valve, the sensor is capable of converting the intensity variation of the electromagnetic field induced by the inductive component to at least one proportionally variable signal of at least one electrical parameter, and the data processing core is capable of estimating one among two possible operational statuses of said metal valve from the variation of at least one electric parameter provided by said sensor.

The inductive component preferably comprises a coil. With regard to the sensor, it preferably comprises an amperemeter (which may or may not be provided in a pre-existing module of data processing core). Said data processing core may comprise a microcontroller or a microprocessor.

The operational status checking method of alternative compressor valve, in accordance with the present invention, comprises a method included in an operational status checking system of alternative compressor valve, as outlined above, and provides at least one step of obtaining electric parameter signal from the sensor, at least one step of estimating the inductance value of the inductive component from the electric parameter signal received from the sensor and at least one step of comparing between the inductance value of the inductive component and the predefined value, which is representative of the valve operational status, which may sometimes be representative of the valve opened operational status and sometimes representative of the valve closed operational status.

More particularly, and also in accordance with the present invention, inductance value is estimated by the equation $$\left( Ln \approx \frac{V \times t_c}{di} \right), \quad [SCSG1]$$

where the value of the valve closed operational status is identified when the estimated inductance value is higher than the predefined value k1·La, and the value of the valve opened operational status is identified when the estimated inductance value is lower than the predefined value k2·La.

Optionally, and still in accordance with the present invention, when the inductive component is fed by a signal in the form of continuous voltage with amplitude, the valve opened operational status is identified when the current value measured in an amperemeter contained in the circuit is higher than the predefined value Imax, wherein the predefined value Imax is experimentally obtained.

Also optionally, and still in accordance with the present invention, when the inductive component is fed by a signal in the form of a continuous current with amplitude, the valve opened operational status is identified when the voltage value measured in a voltmeter contained in the circuit is lower than the predefined value Vmin, wherein said predefined value Vmin is experimentally obtained.

BRIEF DESCRIPTION OF THE DRAWINGS

The present invention will be described in detail based on figures listed below, wherein.

DETAILED DESCRIPTION OF THE INVENTION

As known by a person skilled in the art, and in accordance with Faraday's Induction Law, it is known that a variable magnetic field in an inductive component induces a voltage in the terminals thereof.

In this context, it is verified that a magnetic field may undergo variations stimulated by several electromagnetic factors.

An energized coil, for example, may present variations in its magnetic field by simple proximity interaction with a metal body. In this example, it is further verified that variation of said magnetic field is substantially proportional to the proximity of the metal body.

As described in the embodiments of BR P11105379-8, for example, a magnetic field generated by a coil is responsible for altering the initial operational status of a metal valve. That is, a valve whose initial operational status is "normal closed" tends to be switched to the "opened" operational status. In this sense, BR P11105379-8 achieves all the proposed objectives.

Nevertheless, said embodiments do not comprise means capable of checking if a valve, after the switching stimulation, has its operational status switched or not.

In BR P11105379-8, actuation coils (or magnetic field-generating elements) only has "active" actuation, i.e. they only comprise the function of generating a magnetic field. Therefore, there is no function related to calculation and/or capturing of magnetic field originated from other sources, as to say.

It occurs that, in accordance with the above-mentioned Faraday's Induction Law, movement (or non-movement) of a metal valve tends to generate at least a measurable alteration in the magnetic field of said coil. Therefore, it is observed that if said coil has a "passive" performance it is possible to estimate—within a proper logics—which is the operational status of said metal valve. Relying on this premise the present invention was developed.

Figure 1:
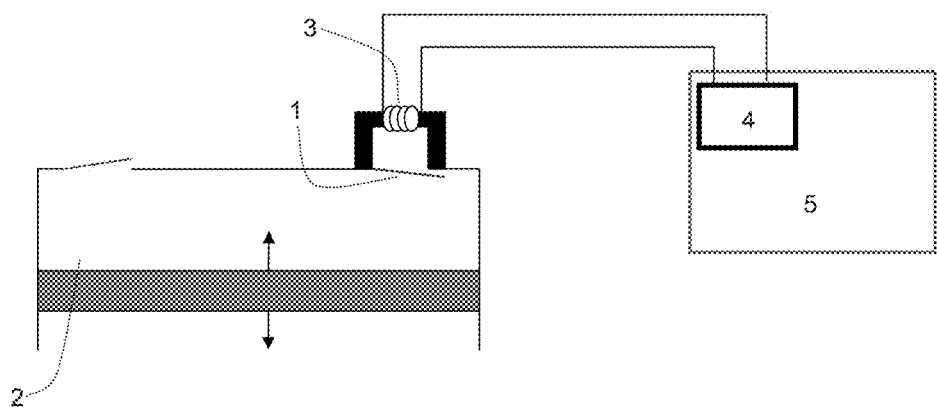
FIG. 1 illustrated a schematic arrangement of the operational status checking system of alternative compressor valve in accordance with the present invention.

From FIG. 1 that depicts a scheme of the operation status checking system of alternative compressor valve in accordance with the present invention, it is observed that there are two metal valves (one is a suction valve and the other is a discharge valve), which are functionally disposed in a compressor cylinder 2 of a conventional alternative compressor. Said operational status checking system of alternative compressor valve further comprises an inductive component 3, a sensor 4 and a data processing core 5.

Valve metals 1 comprise pallet-type valves, which are widely known by a person skilled in the art.

This means that said metal valves 1 comprise binary valves which assume only two operational statuses: opened status (allowing for the passage of fluid through an orifice) and closed status (blocking an orifice and any fluid flow).

Preferably, but not limiting, said metal valves 1 can eventually be integrated in a semi-commanded assembly as described in the above-mentioned document BR PI1105379-8. Nevertheless, said metal valves 1 may also be totally automatic, where switching between their operation statuses depends only on differential pressures of compression cycles, and on the strength of the material to produce valves.

Compressor cylinder 2 essentially comprises a conventional compression cylinder, which is widely known by a person skilled in the art.

Inductive component 3, in accordance with the preferred embodiment of the present invention, comprises a coil and, more specifically, an already preexisting coil, which is used as a semi-command source for metal valves 1 (see BR PI1105379-8).

Sensor 4 comprises an amperemeter and, more particularly, an amperemeter previously existing in one of the modules of data processing core 5. Optionally, said sensor 4 could be capable of "reading" different electric parameters generated by the inductive component 3 (when exposed to a positioning variation of the metal valves 1).

Said data processing core 5 can comprise a microcontroller (or a microprocessor) previously existing in an alternative compressor and it is used to manage actuation and functioning thereof. As formerly said, it is preferred that said data processing core 5 comprises at least one amperemeter module.

According to basic and essential concepts of the present invention, it is verified that inductive component 3 is capable of inducing electromagnetic field whose intensity varies in accordance with the relative proximity of metal valves 1. To this connection, said inductive component 3 has an inductance which value depends on the opening to the moving gap (metal valves 1).

Sensor 4 is electrically associated with inductive component 3, wherein said sensor 4 is capable of converting the intensity variation of the electromagnetic field induced by the inductive component 3 to electric current of proportionally variable amplitude.

A signal provided by sensor 4 is sent to the data processing core 4, which is capable of estimating, based on determined processing logics, one among two possible operational statuses of said metal valves 1, wherein said estimate derives from said amplitude variation of electric current from the sensor 4.

Figure 2:
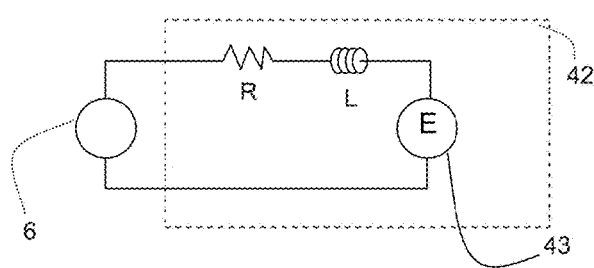
FIG. 2 illustrates an equivalent electric model for a valve coil to be monitored.

FIG. 2 illustrates equivalent electric circuit 42 of valve 1. Such circuit is constituted by electric resistance R of the valve, inductance L depending on the valve gap and voltage 43 ($E = i \cdot dL/dt$), induced by inductance variation during valve movement. Coil feeding signal 6 can be a voltage source or a current source.

Figure 3:
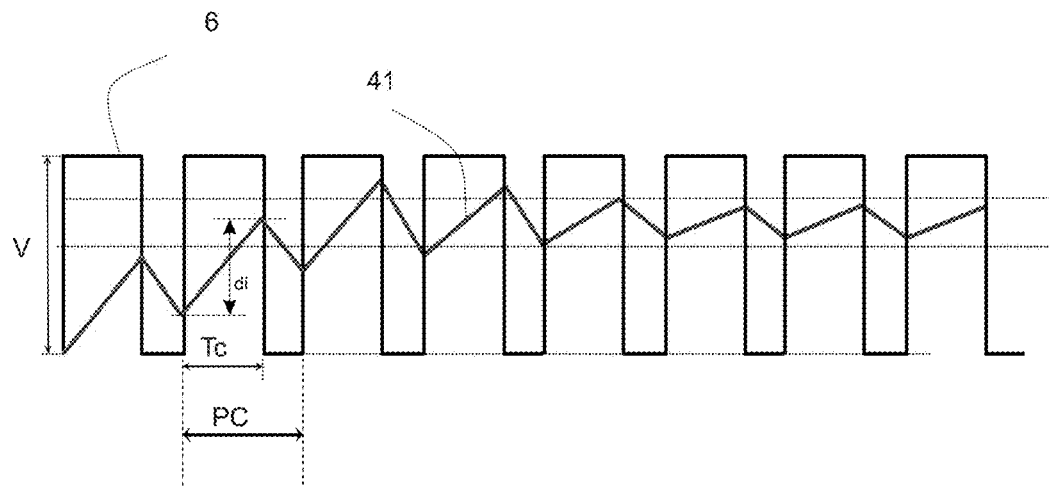
FIG. 3 illustrates a preferential option of the processing logics of the operation status checking method of alternative compressor valve.

FIG. 3 illustrates, in a simplified form, one of the procedures for estimating valve status.

According to this figure, it is depicted signal 6 from the inductive component actuation preferably in the form of a modulated voltage with amplitude V, a switching period PC, and a pulse width having a conduction time $t_c$. Said switching period PC is substantially lower than the period of compression cycle and also substantially lower than the coil electric constant, which value is given by ($\tau = L/R$).

Hence, it can also illustrated in this figure signal 41, resulting from the application of signal 6 and read by sensor 4 as each switching period PC is used for estimating the coil inductance value by equation $$\left(Ln \approx \frac{V \times t_c}{di}\right), \qquad [SCSG2]$$

wherein V is the voltage application to the coil and di is the current variation within time tc.

When the estimate value of inductance fulfills the expression: ($L_n > k1 \cdot L_\alpha$), k1>1 is a constant which dependents on design of a valve and La is inductance valve when said valve is open, then valve 1 can be considered as closed (closed operational status).

From this configuration, there can be determined the moment from which said valve 1 was really closed.

The same methodology can then be used to determine the time that the valve opens. In this case, the inductance value Ln is computed by means of the same equation $$\left(L_n \approx \frac{V \times t_c}{di}\right),$$

when the value fulfills the expression (Ln>k2·Lα), wherein k2>1 and k2<k1, K1 is also a constant depending on a valve design, and then valve 1 can be considered open (opened operational status).

The method illustrated in FIG. 3 can also be used for merely detecting undue opening of valve 1, such as when subjected to elevated pressure differential and then the valve coil current shall be immediately stopped to avoid striking of the valve which would may cause excessive wear and it may break.

Figure 4:
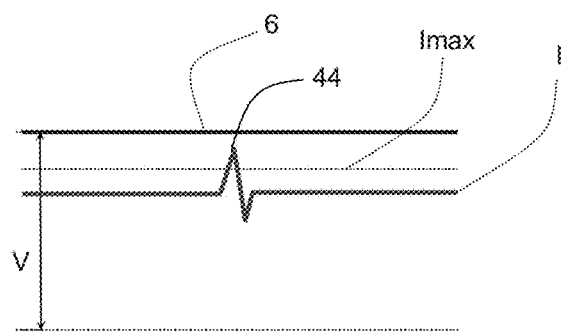
FIG. 4 illustrates an option of detecting undue opening of the valve when its coil is voltage-fed.

Another more simplified method to determine the valve status is illustrated in FIG. 4.

This method is allowed to determine only one change from closed status to opened status, and it can be used for protecting the valve by blocking coil feeding as soon as opening is detected.

In this method, the valve coil is fed with a signal 6 in the form of a constant voltage of amplitude V to maintain the valve in the closed status. Consequently, said coil will have a constant current of value I, which value will be equal to the applied voltage V divided by the coil resistance R (Ohm Law), as illustrated in the circuit of FIG. 2. Since the valve under this condition is in the closed status, inductance variation will not occur and term 43 will be null. In the case where the valve is subjected to an elevated pressure differential which causes undue opening thereof, a negative inductance variation, caused by the opening thereof, will lead to the rise of an negative induced voltage due to term 43. Hence, an increase of current I will suddenly occur, resulting in a current peak 44.

Detection of this peak is made by comparing the current value I with a superior Imax limit.

Figure 5:
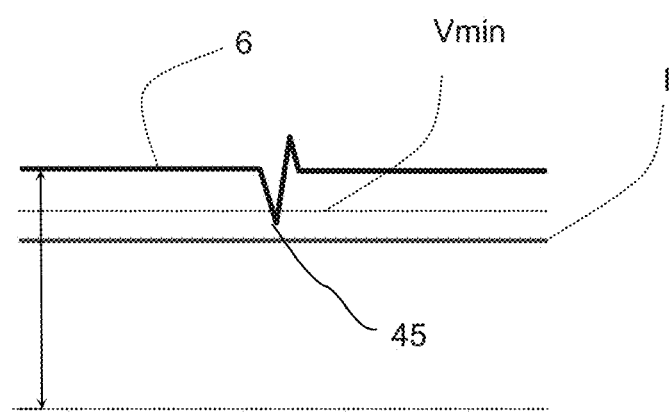
FIG. 5 illustrates an option of detecting undue opening of the valve when its coil is current-fed.

Another variation of the detecting opening of the valve is illustrated in FIG. 5.

This method can also only determine a change in the closed-to-opened status, and it may be used for protecting the valve by stopping the coil feeding as soon as the opening is detected.

In this case, said valve coil is fed with a signal 6 in the forma a current constant I. As a result, the coil will have a constant voltage V, which value is equal to the current I multiplied by the coil resistant R (Ohm Law). Since the valve under this condition is in the closed status, inductance variation will not occur and the induced voltage given by the term 43 will have a null value. If the valve is subjected to an elevated pressure differential which will unduly open the valve, the negative variation inductance will cause a sudden reduction in voltage V on the coil which will result in a negative peak 54.

Detection of this peak is effected by comparing voltage V with a lower limit Vmin.

Methods of detecting the opening of the valve as illustrated in FIGS. 4 and 5 are very easily implemented, since to do so there will only be required a circuit for comparing current or voltage values having maximum and minimum limits, respectively. To this effect, only an analogical circuit with a comparator is needed, thereby eliminating the need to use a microprocessor or microcontroller.

Disclosed examples of the preferred embodiment of the present invention shall lead to the interpretation that the scope thereof contemplates other possible variations, which are only limited by the contents of claims, included therein the possible equivalent means.

The invention claimed is:

1. A method for checking an operational status of an alternative compressor valve included in an operational status checking system, the operational status checking system comprising at least one metal valve disposed in at least one compression cylinder of an alternative compressor, at least one inductive component, at least one sensor, and at least one data processing core, wherein the at least one metal valve is configured to switch between at least two operational statuses, wherein the at least one inductive component is fed by a continuous current signal having an amplitude, the method comprising:

obtaining an electric parameter signal from the at least one sensor;

measuring a voltage value of the at least one inductive component from the electric parameter signal received from the at least one sensor;

comparing the voltage value of the at least one inductive component to an experimentally obtained predefined value;

determining a valve opened operational status of the at least one metal valve if the voltage value is lower than the experimentally obtained predefined value; and stopping feeding of a valve coil associated with the at least one metal valve if the valve opened operational status is determined to be open due to an elevated pressure differential when the valve opened operational status should be closed.

2. A method for checking an operational status of an alternative compressor valve included in an operational status checking system, the operational status checking system comprising at least one metal valve disposed in at least one compression cylinder of an alternative compressor, at least one inductive component, at least one sensor, and at least one data processing core, wherein the at least one metal valve is configured to switch between at least two operational statuses, wherein the at least one inductive component is fed by a continuous current signal having an amplitude, a switching period, and a switching time, the method comprising:

obtaining an electric parameter signal from the at least one sensor;

measuring an electric current value of the at least one inductive component from the electric parameter signal received from the at least one sensor;

comparing the electric current value of the at least one inductive component to an experimentally obtained predefined value;

determining a valve opened operational status of the at least one metal valve if the electric current value is greater than the experimentally obtained predefined value; and stopping feeding of a valve coil associated with the at least one metal valve if the valve opened operational status is determined to be open due to an elevated pressure differential when the valve opened operational status should be closed.

* * * * *